Sept. 11, 1962  R. A. FISHER  3,053,289
SPRING ASSEMBLY MACHINE
Filed March 2, 1959  11 Sheets-Sheet 2

INVENTOR.
Richard A. Fisher
BY
Ooms, McDougall,
Williams & Hersh
Attorneys

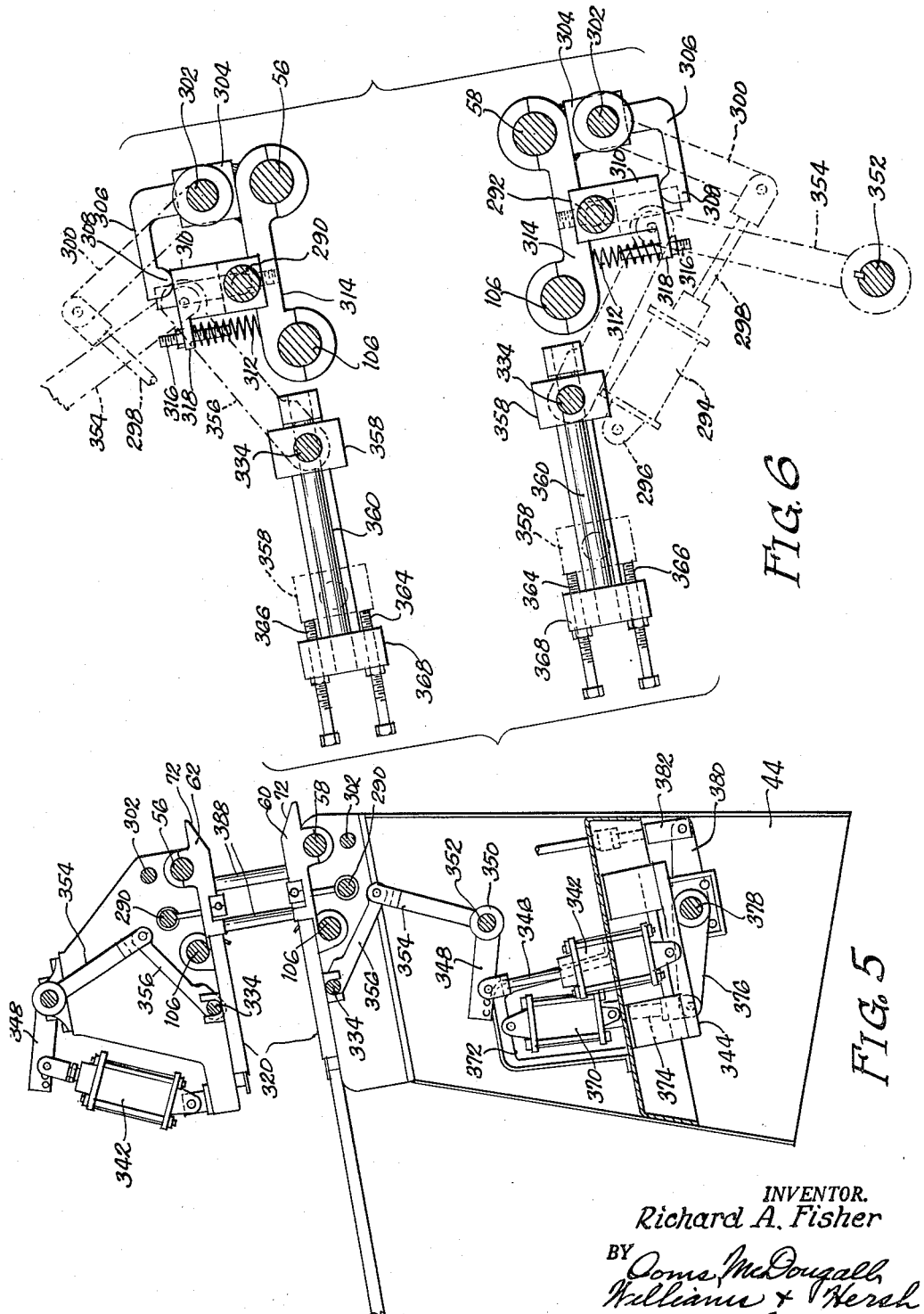

Sept. 11, 1962  R. A. FISHER  3,053,289
SPRING ASSEMBLY MACHINE
Filed March 2, 1959  11 Sheets-Sheet 4
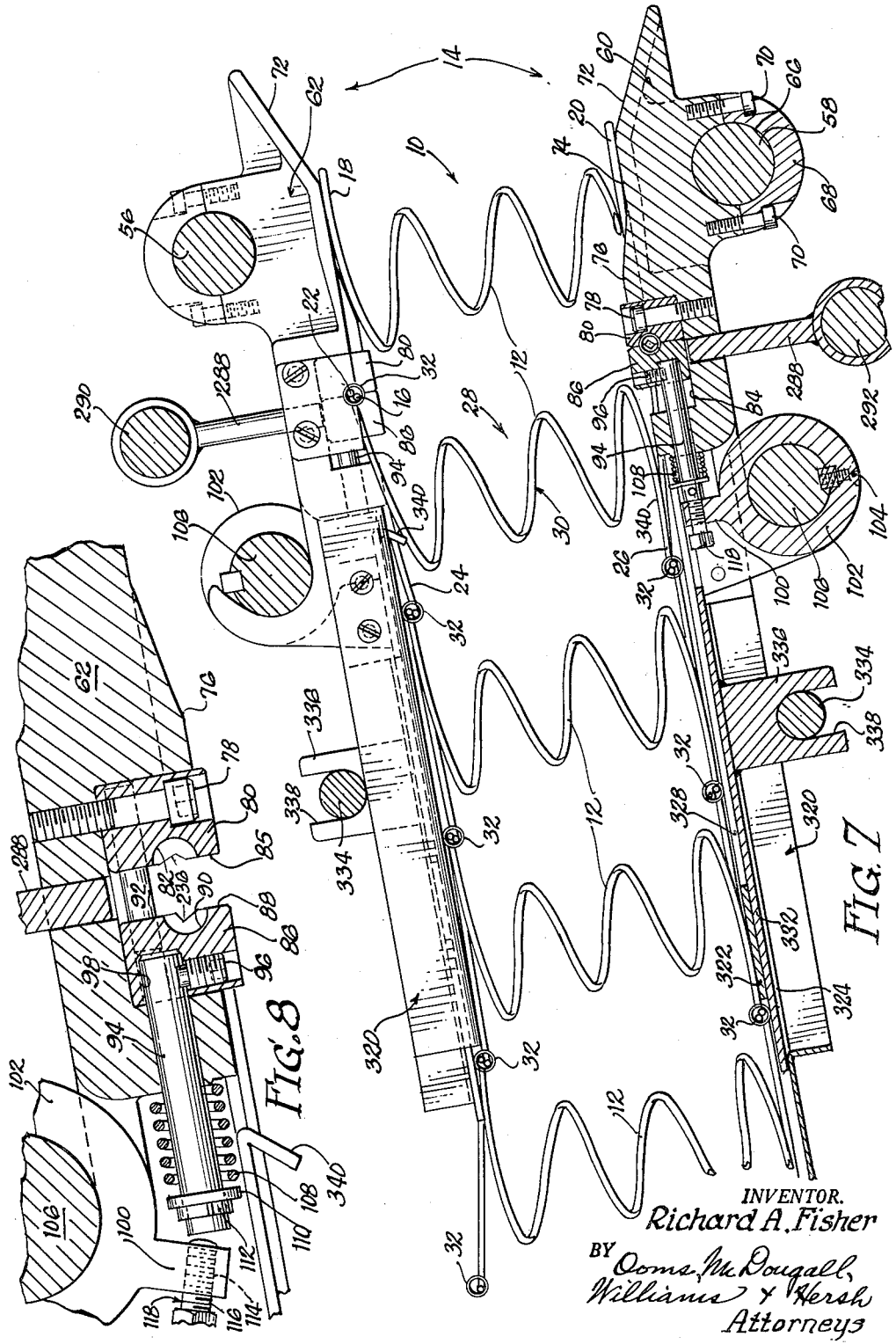
INVENTOR.
Richard A. Fisher
BY Ooms, McDougall,
Williams & Hersh
Attorneys Sept. 11, 1962 R. A. FISHER 3,053,289
SPRING ASSEMBLY MACHINE
Filed March 2, 1959 11 Sheets-Sheet 5

INVENTOR.
Richard A. Fisher
BY
Pennie, McDougall,
Williams & Hersh
Attorneys

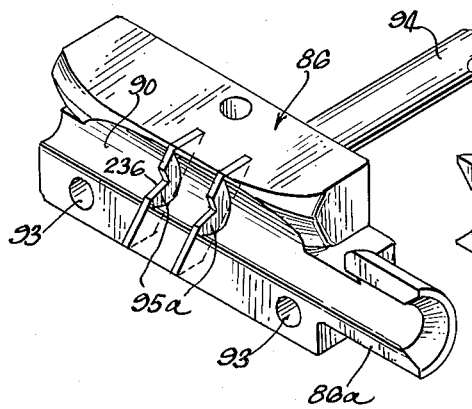
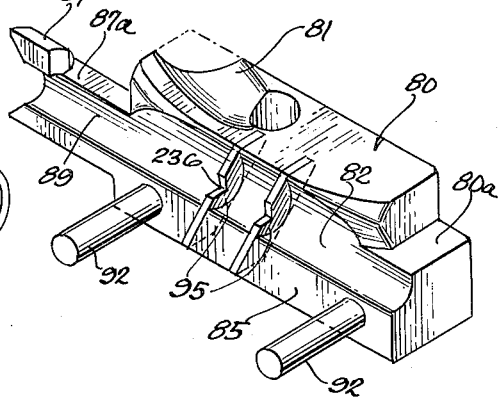
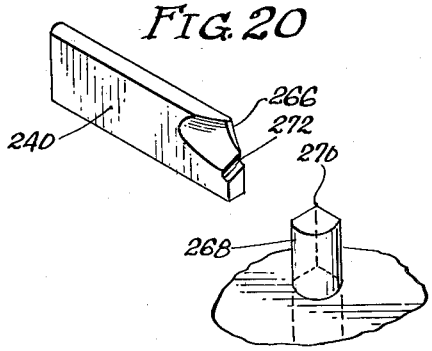
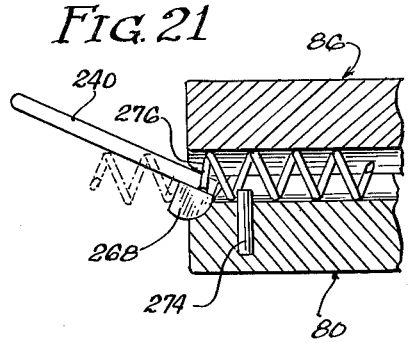
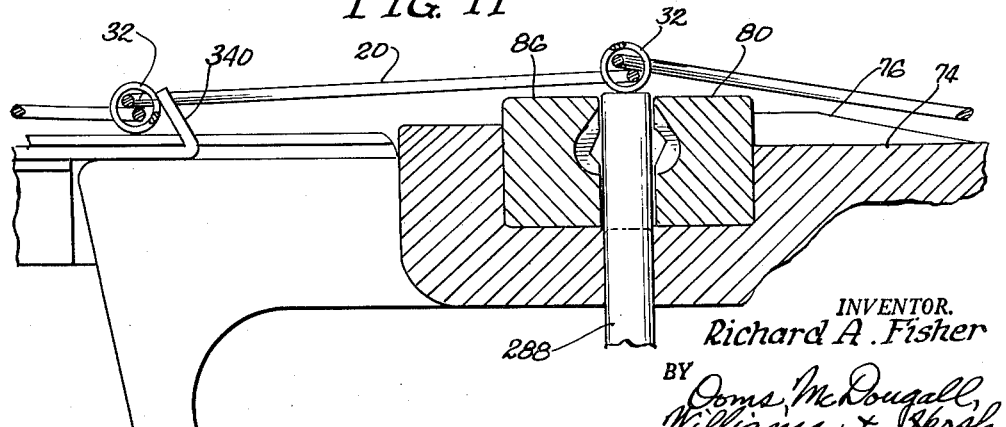

Sept. 11, 1962 R. A. FISHER 3,053,289
SPRING ASSEMBLY MACHINE
Filed March 2, 1959 11 Sheets-Sheet 7

INVENTOR.
Richard A. Fisher
BY Ooms, McDougall,
Williams & Hersh
Attorneys

INVENTOR.
Richard A. Fisher

INVENTOR.
Richard A. Fisher

United States Patent Office 3,053,289
Patented Sept. 11, 1962

3,053,289
SPRING ASSEMBLY MACHINE
Richard A. Fisher, Minneapolis, Minn., assignor to The United States Bedding Company, St. Paul, Minn., a corporation of Minnesota
Filed Mar. 2, 1959, Ser. No. 796,647
20 Claims. (Cl. 140—92.7)

This invention relates to a spring assembly machine and, more particularly, to a machine for joining a plurality of coil springs into a spring assembly for use in bed springs, mattresses, and spring units for seats and upholstered furniture.

In a spring assembly of the type described, a multiplicity of coil springs, arranged in rows, are interconnected by helical tie wires which are laced crosswise between the upper and lower terminal coils of the aligned coil springs in adjacent rows to build up the desired number of rows of coil springs into an assembly having the desired spring count and dimension as controlled by the number of coil springs in each row and by the number of rows of coil springs.

It is an object of this invention to produce a new and improved spring assembly machine of the type described.

More specifically, it is an object of this invention to produce a spring assembly machine which is capable of automatic operation through a predetermined sequence of steps properly to align the terminal coils of the coil springs in adjacent rows; to clamp the aligned coil springs in position to be interlaced by helical tie wires displaced crosswise along the rows of coil springs; to feed helical tie wires to the machine in proper alignment both with the upper and lower terminal coils of the aligned coil springs in the adjacent rows; to feed the separated helical tie wires through the machine to interlace the aligned terminal coils of the aligned coil springs for establishing a permanent interconnection therebetween; to stop the helical feed when the helical tie wires have traversed the aligned terminal coils of the aligned coil springs; to cut off and clinch the ends of the helical tie wires upon full traverse of the aligned terminal coils of the aligned rows of coil springs to secure the helical tie wires in position of use; to displace the interlaced terminals coils of the coil springs for release from the clamping means to enable displacement of the assembled rows of coil springs into position for engagement with the next row; and to effect displacement of the rows of assembled coil springs in the machine to the next position for receiving the subsequent row of untied coil springs for attachment onto the released end of the assembly, and it is a related object to produce a spring assembly machine of the type described which is sturdy in construction and simple in operation; which is formed of relatively fed and easily fabricated parts; which is capable of automatic operation in all steps with the separation feed of the coil springs into position of use in the machine and which is also subject to individual sequencing for adjustment or for effecting a specific operation; which occupies a minimum amount of floor space within an assembly plant; which is capable of adjustment to vary the number of coil springs in each row for adjustment of the size and coil count in the spring assembly; and which is capable of rapid and errorless operation in the assembly of multiple coil springs into a uniform spring assembly.

These and other objects and advantages of this invention will hereinafter appear and for purposes of illustration, but not of limitation, an embodiment of the invention is shown in the accompanying drawings, in which—

FIGURE 5 is a sectional elevational view taken across the center of the head of the machine between jaw members;

FIGURE 6 is a sectional view through the head of the machine illustrating means for controlling the stroke of the indexing unit;

FIGURE 7 is an enlarged sectional view through the head of the machine with the upper portion taken along a line between the jaw members and the lower portion taken along a line through the jaw members;

FIGURE 8 is an enlarged sectional view of the jaw portions shown in FIGURE 7, but showing the arrangement of parts when the jaw is in open position;

FIGURE 11 is an enlarged sectional view of the knockout pin in knockout position between the clamping members;

FIGURE 17 is an enlarged sectional view of the displacement means for the assembled rows of coil springs;

FIGURE 18 is a perspective view of the fixed clamping member;

FIGURE 19 is a perspective view of the movable clamping member;

FIGURES 20 and 21 are perspective views of the cutoff and clinch mechanism; and

Figure 1:
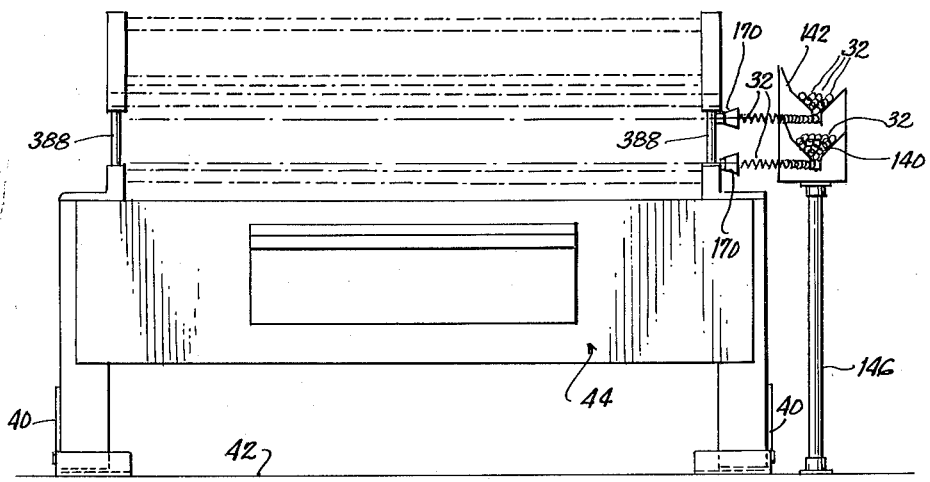
FIGURE 1 is a schematic front elevational view of a spring assembly machine embodying the features of this invention.

In order that the detailed description of the spring assembly machine might be more readily understood, it can be stated generally that a row 10 of coil springs 12 is manually placed between the jaws 14 of the machine in a suitable position wherein the leading edge portions 16 of the upper and lower terminal coils 18 and 20, respectively, of the coil spring 12 overlap the trailing edge portions 22 of the upper and lower terminal coils 24 and 26, respectively, of the row 28 of the coil spring 30 previously tied into the spring assembly. The overlapped portions of the previously tied and the untied rows of coil springs are then clamped between elements of the jaw members properly to position the overlapped portions for being interlaced by helical tie wires 32 advanced crosswise between the aligned rows 10 and 28 of the terminal coils of the coil springs for effecting an interconnection therebetween. The coils are overlapped before the jaws close due to the spacing and design of the jaws and elements thereof. Upon closing, the clamped portions of the coils are flattened out slightly. After the helical has been interlaced and the jaws opened, the distorted coils return to normal position to provide a very tight assembly, as desired.

The helicals 32 are cut to length upon clearance of the last of the coil springs in the rows and then the cut ends at the opposite ends of the helicals are clinched to form loops 34 which militate against unwinding of the helicals to release any of the interconnected coil springs. After the helicals 32 are cut and clinched, the clamped terminal coils of the coil springs are released and displaced to free them from the jaws so that the group of coil springs now tied into the assembly can be displaced through the machine to position the newly tied rows of coil springs into a position to bring the trailing edges of the terminal coils of the coil springs in overlapping relation with the leading edges of the terminal coils of the untied coil springs inserted into the machine between the jaws for addition onto the row which has just been tied into the assembly. Thus, rows upon rows of coil springs are interconnected one after the other until the desired number of rows has been joined in the spring assembly. When the last of the rows has been tied into the spring assembly, one set of jaws is displaced in the direction away from the other to release the coil springs for enabling the completed assembly to be removed from the machine.

Figure 4:
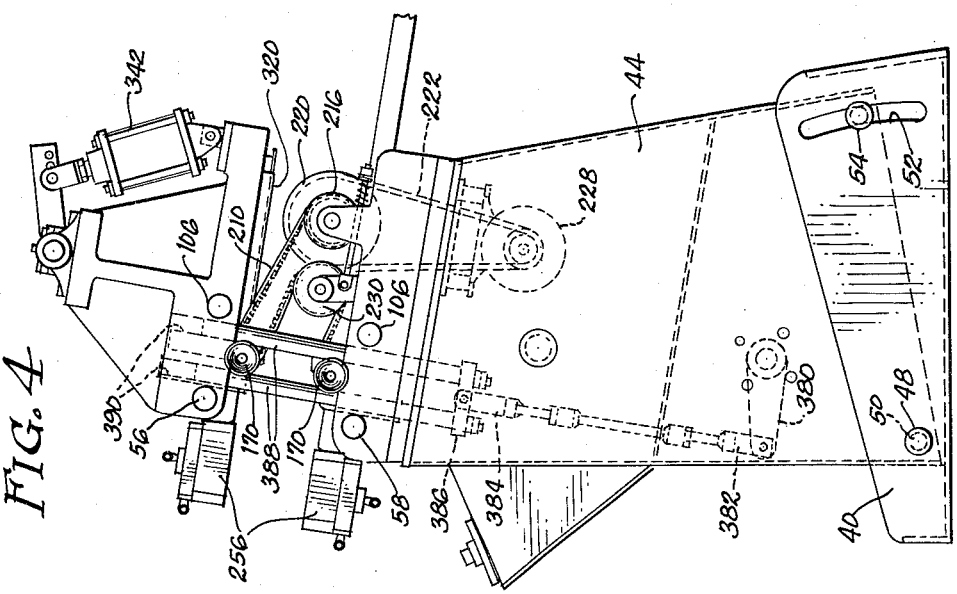
FIGURE 4 is an elevational view of the spring assembly machine from the end opposite that of FIGURE 3.
Figure 3:
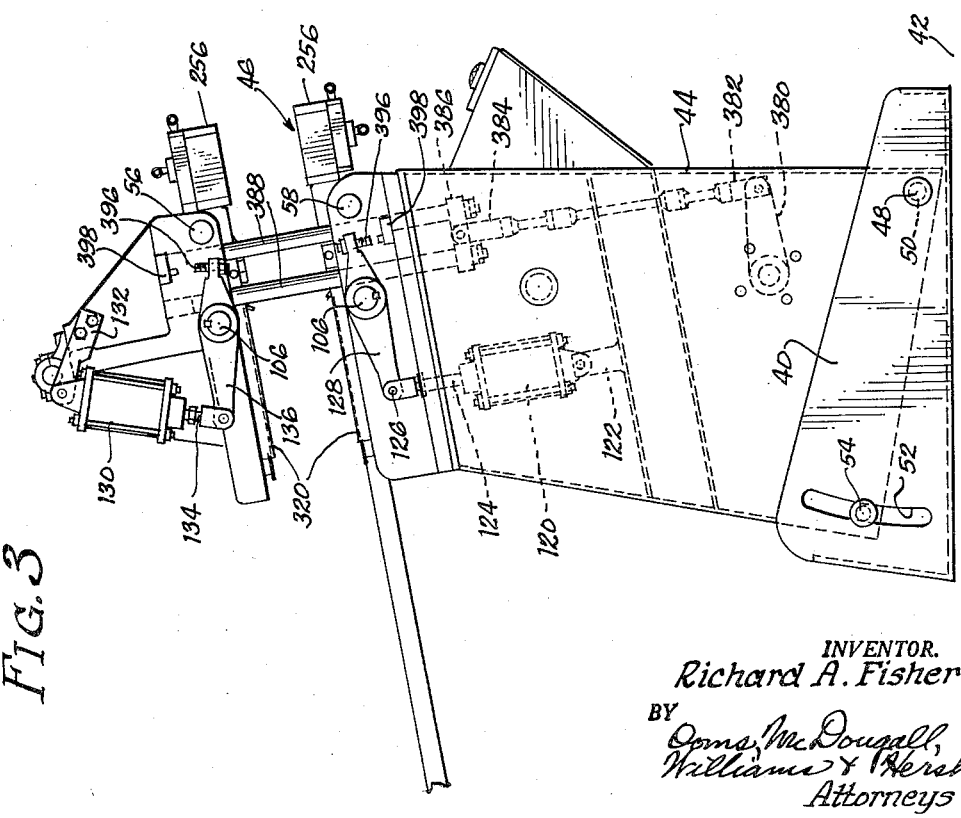
FIGURE 3 is an elevational view of the spring assembly machine from the left end of FIGURE 1.

Referring now to the drawings for a more detailed description of the machine, the numeral 40 designates the base of the machine which is adapted to be anchored to the floor 42 and upon which the frame 44 of the machine is mounted. As illustrated in FIGURES 3 and 4 of the drawings, the frame is constructed to mount the head section 46 of the machine at a downward incline from the feed end at the front to the delivery end at the rear. For purposes of adjusting the slope to the operator's or to existing conditions for most efficient use, the frame 44 is pivotally mounted on the base 40. For this purpose, the frame 44 is provided with studs 48 extending laterally from the side walls thereof in the forward end portion into engagement with a suitable sleeve or opening 50 in the base. The rearward end portion of the base is provided with a vertically disposed, curvilinear slot 52 having the stud 48 as its center, and the frame is provided with studs 54 extending laterally from the side walls thereof through said slot 52 and with means on the ends of the studs 54 for fixing the frame in the desired angular position. It will be understood that the elements described can be interchanged to provide the studs on the base 40 and the openings or slots in the frame 44 for corresponding adjustment to a desired position of use.

Fixed to the frame, in the head portion of the machine, are a pair of horizontally disposed, vertically spaced-apart, and crosswise-extending parallel upper and lower support bars 56 and 58, respectively. A group of lower fixed jaws 60 is removably secured in laterally spaced-apart relation to the lower support bar 58 and a similar group of upper jaws 62 is removably secured in a corresponding laterally spaced-apart relation to the support bar 56, with the upper jaws aligned vertically with the lower jaws for cooperation one with the other in the machine. The upper and lower jaws are of similar construction, with the exception of the jaws at the ends of the rows which embody the cutoff and clinch mechanism. As a result, it will suffice to give a description with respect to the construction of only one of the jaws as representative of the remainder.

Each jaw is formed with a base 64 having a curvilinear recess 66 dimensioned to correspond with the diameter of the support bars 56 or 58 for enabling the jaw to be fixed thereto, as by means of a clamping sleeve 68 brought into engagement with the base 64 by means of bolts 70 to grip the support bar therebetween. Each jaw member is formed with an inclined ramp 72 at the leading end portion extending to the face 74 of the jaw member to provide cooperating cam sections at the entrance end defined between the upper and lower jaw members spaced one from the other to be greater than the normal length of the coil springs at the leading end but less than the normal length of the coil springs at the trailing end to facilitate feeding of the coil springs into the area between the jaw members.

Beyond the ramp, each jaw is formed with a raised portion 76 over which he leading edge of the terminal coils of the coil springs ride. Secured, as by means of a bolt 78 within a slot 84 formed in the leading edge of each jaw, is a clamping member 80 formed with a recessed portion 82 of substantially semi-circular shape extending crosswise in the vertical face 85 at about the level with the upper surface of the jaw. Each such clamping member is formed with an extension 87 of cylindrical shape and having an arcuate bore 89 as a continuation of the recess 82. The extension is dimensioned to correspond with the spaced relation between jaws to provide a continuous cylindrical guide opening for the helical tie wire. The clamping member 80 and the raised section 76 are formed to a curvilinear shape in horizontal cross-section to function as a saddle on which the terminal coil of the coil spring rests properly to position the coil spring between the jaw members. The surface portion 81 of the clamping member 80 is hollowed to fit the rise in the turns of the coils adjacent the terminal coils of the coil spring to enable the coil spring to be received in fitting relation in a compressed state on the jaw.

The support bars 56 and 58 are spaced one from the other by a distance to position the facing portions of the jaw members in a spaced relation which is slightly less than the normal length of the relaxed coil spring. As a result, the coil spring will be tensioned as it is advanced between the inclined facing ramps into position of use between the jaws. The raised portion 76 and the leading edge portion of the clamping member 80 is such as to increase the tension of the spring as the terminal coils ride thereover so that the leading edge of the terminal coil will snap into place witthin the circular recess 82 of the clamping member as the leading edge portion of the terminal coil of the coil spring clears the edge of the clamping member 80, thereby to signal the proper positioning of the coil spring between the jaws with the leading edges of the terminal coils aligned with the recessed portions 82 of the clamping members. The top wall of the extension and the opposite wall of the clamping member are cut away, as at 87a and 80a, to enable the leading edge of the terminal coil to become aligned with the recess 82.

Mounted for sliding movement within the slot 84 of each jaw member, in the direction toward and away from the clamping member, is another clamping member 86. The latter is adapted to be displaced within the recess between closed position in abutting relation with the facing edge of the clamping member 80, as illustrated in FIGURE 7, and open position spaced rearwardly of the face of the clamping member 80, as illustrated in FIGURE 8. The front face 88 of the slidable clamping member 86 is also formed with a hemi-spherical recess 90 extending crosswise thereof and in alignment with the recess 82 of the fixed clamping member to form a cylindrical opening therebetween when the slidable member is in closed position. It is also provided with an extension 86a corresponding with the extension 87 for cooperation therewith to define a cylindrical opening therebetween. The slidable clamp 86 is guided in movement between open and closed position on pins 92 fixed to extend from the face of the clamping member 80 and slidably received within aligned openings 93 in the movable clamping member 86. In the preferred modification, the recessed portions 82 and 90 of the clamping members are provided with cross-plates 95 and 95a spaced apart laterally to correspond with one-half of the pitch of the helical, thereby completely to control the position and movement of the helical tie wires crosswise through the clamping members to achieve a proper interlacing with the overlapping edges of the terminal coils of the adjacent rows of coil springs which are confined between the clamping members when in closed position.

Actuation of the movable clamp 86 to closed position is achieved by means of a rod 94 secured at one end, as by a set screw 96, in an opening 98 in the back side of the clamp. The free end of the rod 94 extends slidably through the rearward end portion of the jaw in position to be engaged by an abutment 100 integral with a sleeve 102 secured, as by set screws 104, for rotational movement with a drive shaft 106 extending crosswise of the machine. The rod 94 is constantly urged in the direction to displace the clamp 86 toward open position, as by means of a coil spring 108 concentrically positioned about the rearward end portion of the rod between the back wall of the jaw and a stop, in the form of a washer 110, fixed onto the end of the rod as by means of a ring 112.

To adjust the movement of the shiftable clamp 86 to closed position, the abutment 100 on the sleeve 102 is provided with a threaded opening 114 adapted to receive the threading shank 116 of a bolt member 118 having its end in position to engage the rearward end of the rod. Thus, the amount which the shank extends from the abutment for engagement with the rod can be adjusted by turning movement of the head of the bolt in one direction or the other. The actuating abutments 100 are all connected to one or the other of the upper and lower shafts 106 simultaneously to displace the clamping members to closed or clamping position.

When the slidable member 86 is shifted to closed position, the trailing edge of the terminal coil of the coil spring lies in the path of the recessed portion to be displaced therein with the clamping member into overlapping relationship with the leading edge portion of the untied coil inserted into the fixed jaw. The overlapped edge portions are clamped in position within the cylindrical opening formed between the clamping members in position to be interlaced by the helical tie wire. The recessed portions of the clamping members and their extensions provide a substantially continuous tubular guide section extending crosswise of the machine for guiding the helical tie wire therethrough as it is fed through the machine.

Reciprocal rotational movement of the shaft for control of the movement of the slidable clamping member is achieved by means of an air cylinder 120 pivotally mounted for rocking movement on a bracket 122 fixed to the frame 44. The free end of the piston rod 124 is pivoted at 126 onto one end of a lever arm 128 which is fixed at its central portion to the lower shaft 106. The upper shaft is similarly operated by an air cylinder 130 pivoted at its base upon a bracket 132 fixed to an upper portion of the frame. The free end of the piston rod 134 is pivoted onto the end of a similar lever 136 rocked about its central portion which is fixed to the upper shaft 106 for reciprocal rotational movement therewith (see FIGURE 3).

Having described the construction and operation to lock the overlapped edge portions of the terminal coils of the adjacent rows of coil springs within the tubular guide slot formed between the clamping members, description will now be made of the feed of the helical tie wires to the machine and of the advancement of the helical tie wires by the machine through the aligned tubular guide openings to interlace the terminal coils of the adjacent rows of the coil springs.

Figure 2:
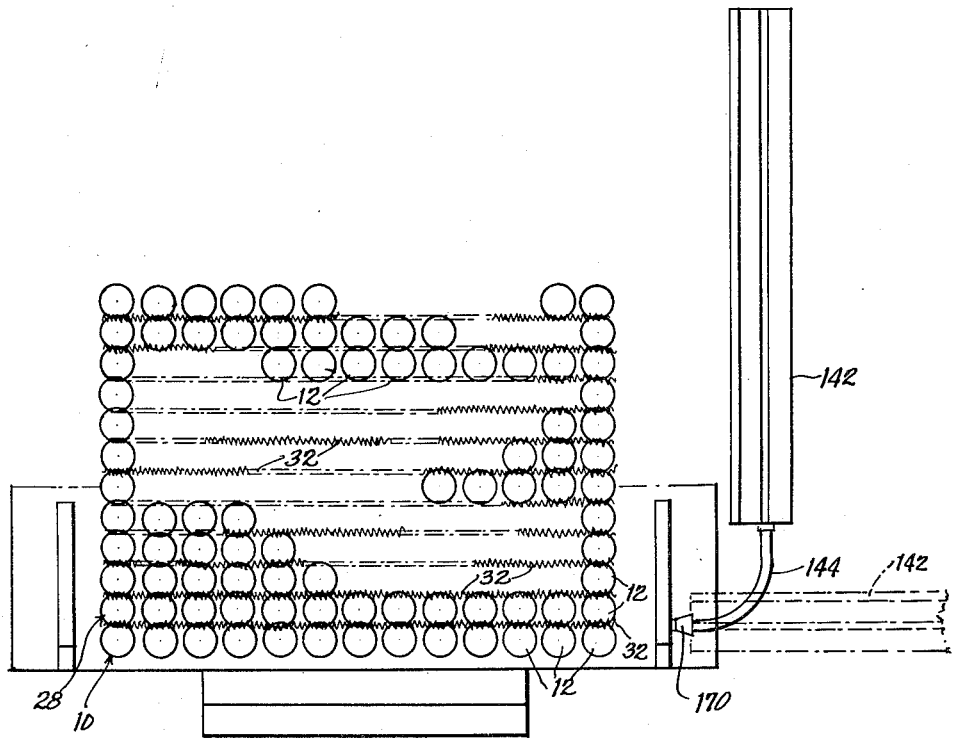
FIGURE 2 is a top plan view of the machine shown in FIGURE 1, with elements of the machine omitted for purposes of illustrating the construction of the spring assembly.

As illustrated in FIGURES 1 and 2, the helical tie wires 32 are supplied in large numbers in trays 140 and 142 vertically spaced apart by an amount corresponding to the spaced relationship between the upper and lower tubular openings formed between the upper and lower jaw sections. The trays can be arranged to extend endwise of the machine, as shown by the broken lines in FIGURE 2, for linear feed of the helicals to the machine. In the alternative, and particularly where space is at a premium, the trays can be arranged alongside of the machine, as illustrated by the solid lines in FIGURES 1 and 2 but, in the latter event, a feed tube 144 is required to turn the helicals at right angles for endwise feed into the machine. The trays can be supported at the desired height upon stands 146.

Each tray comprises an elongate trough-shaped member having a length corresponding to the length of the helical tie wires, a group of which are adapted to be received within the trough. One side of the trough, preferably the outer side 148, is adapted to extend outwardly for a greater distance than the opposite side for facilitating the loading of the trays with helical tie wires. The bottoms of the trays are formed with a section 150, preferably of rectangular shape, dimensioned to provide a groove 152 extending throughout the length of the hopper and dimensioned to receive at least one of the helical tie wires therein in feeding relation.

Figure 9:
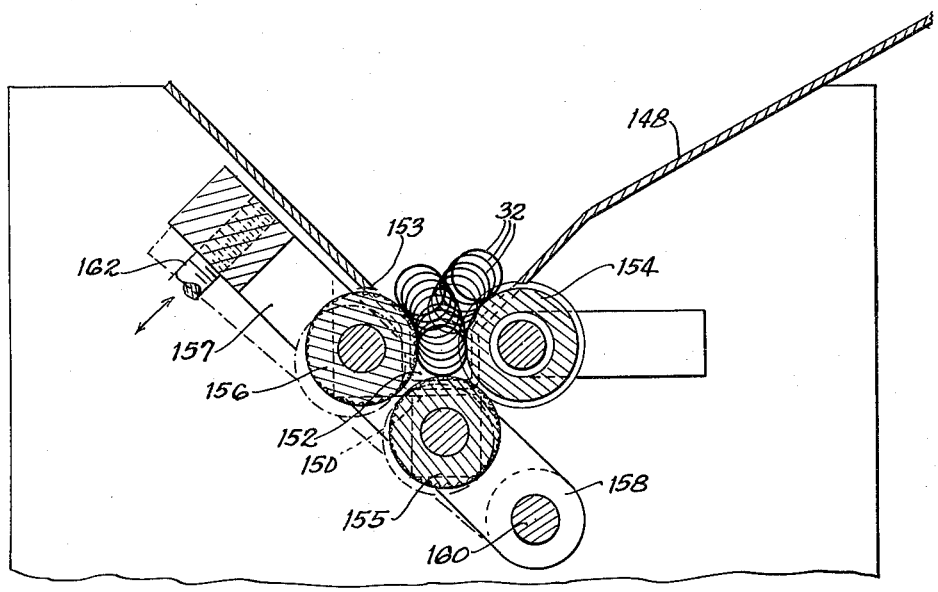
FIGURE 9 is a sectional view showing the hopper feed for displacing a helical tie wire into the machine.
Figure 10:
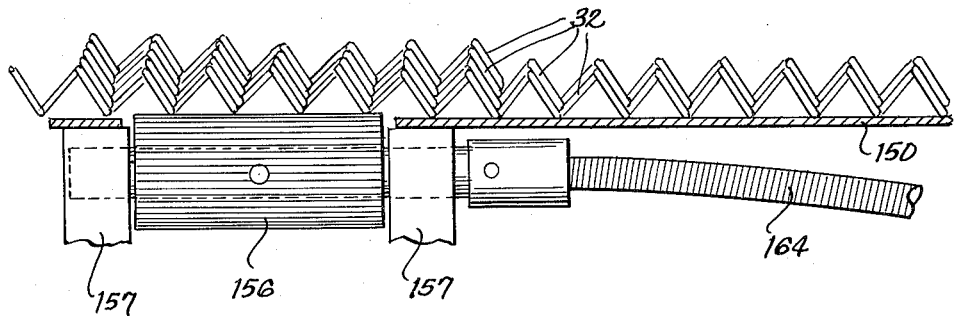
FIGURE 10 is a sectional elevational view illustrating the drive for the hopper feed.
Figure 12:
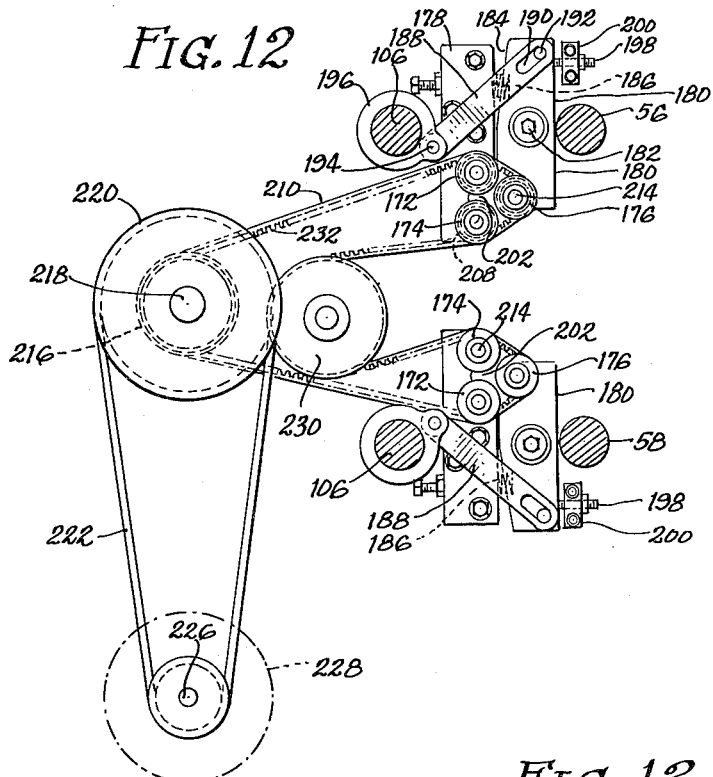
FIGURE 12 is a sectional elevational view showing the drive for lacing the helical tie wires through the aligned terminal coils of the adjacent rows of aligned coil springs.
Figure 13:
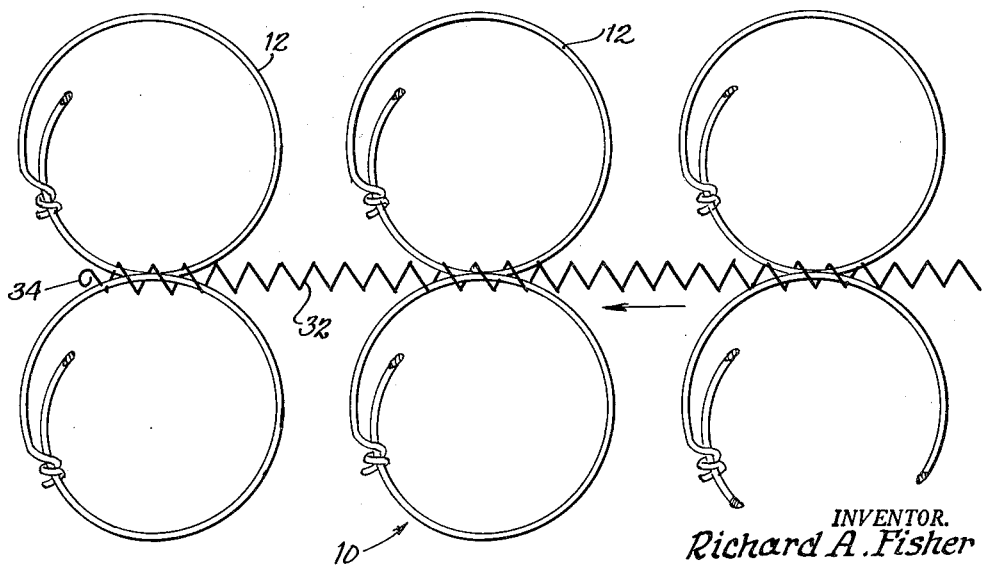
FIGURE 13 is a top plan view of one end of the joined rows of terminal coils of coil springs illustrating the cutoff and clinching of the end of the helical tie wire.

The helical tie wires will be received in nested relation in the feed trays, as indicated in FIGURE 9. Feeding relation to advance only one of the helicals to the spring assembly machine is effected by means of a group of rollers 154, 155 and 156 operative through an opening 153 in the base of the trays. One of the rollers, namely roller 154, is a guide roller which is mounted for free rotational movement in a fixed position.

The other two rollers 155 and 156 are driving rollers. One of the drive rollers 155 is positioned beneath the tray while the other, 156, is positioned alongside of the tray opposite the guide roller 154. The drive rollers are mounted for rotational movement in a yoke 157 pivoted at 158 on a stud 160 fixed to the frame to enable rocking movement of the yoke 157 between raised position (solid lines) and retracted position (broken lines), as illustrated in FIGURE 9. The yoke is adapted to be rocked between raised and retracted positions through a shaft 162 responsive to an air motor (not shown). The drive rollers 155 and 156 are actuated by a flexible drive shaft 164 connected at one end to the rollers and connected at the other end in a conventional manner to a motor for rotation. The rollers are preferably formed with surfaces of rubberized or other friction material to transmit rotational movement of the rollers to rotational movement of the engaged portion of the protruding helical when the yoke is rocked to raised position for engagement with the helical.

For effecting linear displacement of but one helical from the stack, the dimensions between the centers of the rollers, when in raised position, are such as to allow only one helical to be engaged between centers by the surfaces of the rollers. In the event that more than one helical is nested between the rollers before the movable rollers are rocked to raised position, all but one will be displaced from operative engagement when the movable rollers are raised because more than one helical cannot maintain the same diameter about the same center between the rollers. Thus, different centers for the rollers are selected for operation with different helicals of different diameters.

The helicals selected by the feed rollers are advanced individually into and through guide funnels 170 fixed to the frame of the machine in endwise alingment with the helical guide openings defined by the clamping members. Advancement in feeding relation to the machine is continued until the leading ends of the helicals enter into the area between the spinners 172, 174 and 176 forming a part of the machine feed. In the illustrated modification, use is made of three spinners, but more can be employed. Two of the spinners 172 and 174 are arranged vertically in side-by-side relation on a stationary plate 178 fixed to the frame of the machine. The other spinner 176 is a movable spinner which is adapted to be shifted in the direction toward and away from the other two between operative and inoperative position for gripping the helical between the rollers, when in operative position, and for release of the helical, when in inoperative position.

For this purpose, the spinner 176 is mounted for free rotational movement on a plate 180. The plate is mounted for rocking movement about a pivot 182 which is offset from the spinner 176 in order to displace the spinner between operative and inoperative positions. The edge 184 of the plate opposite the spinner 176 with respect to the pivot is formed with a slope to enable the plate to be rocked about its pivot in a direction to bring the inclined edge towards the adjacent edge of the fixed plate, thereby to displace the spinner to inoperative position. The plate 180 is resiliently urged towards operative position, as by means of a coil spring 186 located between the inclined edge 184 of the movable plate and the adjacent edge of the stationary plate. The rocking movement of the plate 180 about its pivot is controlled by a lever 188 having a slot 190 in one end adapted to receive a stud 192 fixed to the plate 180. The other end of the lever is pivoted at 194 upon an offset on a sleeve 196 fixed for rotational movement with the shaft 106 by which the clamping member is actuated to closed position.

In the construction described, rotational movement of the shaft 106 to advance the clamping members to closed position operates simultaneously to displace the lever 188 to extended position, whereby the stud 192 is relocated in an intermediate portion of the slot 190. This frees the plate for displacement by the spring 186 toward operative position, whereby the helical becomes resiliently engaged between the three cooperating spinners. Rotational movement of the shaft 106 in the opposite direction causes retraction of the lever 188, whereby the stud becomes engaged by the outer end portion of the slot to effect displacement of the plate about its pivot to inoperative position. This retracts the spinner 176, whereby a driving relationship is not established with a helical located between the spinners. The position of the plate 180 and spinner 176 in operative position can be adjusted by means of a set screw 198 which is threadably received within a threaded opening in a bracket 200 to position the end of the set screw in the path of the plate to stop the plate in any desired operative position. The stationary plate 178 is formed with a cut-out 202 in the area between the spinners to enable free passage of the helical therethrough into position to be engaged by the spinners.

Figure 14:
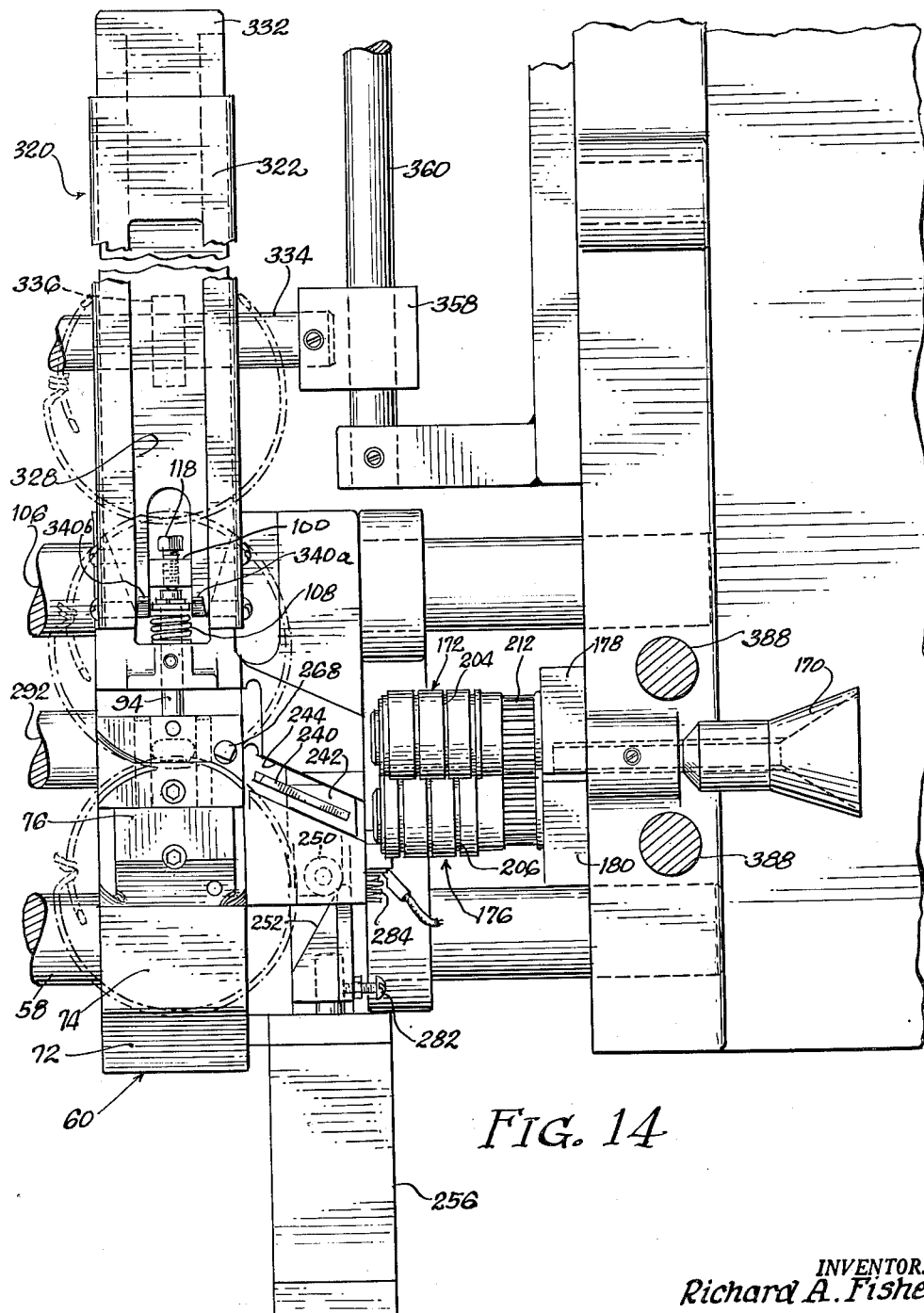
FIGURE 14 is a top plan view of the helical tie wire feed mechanism and the cutoff and clinch means at the end of the row of coil springs adjacent the helical feed.
Figure 15:
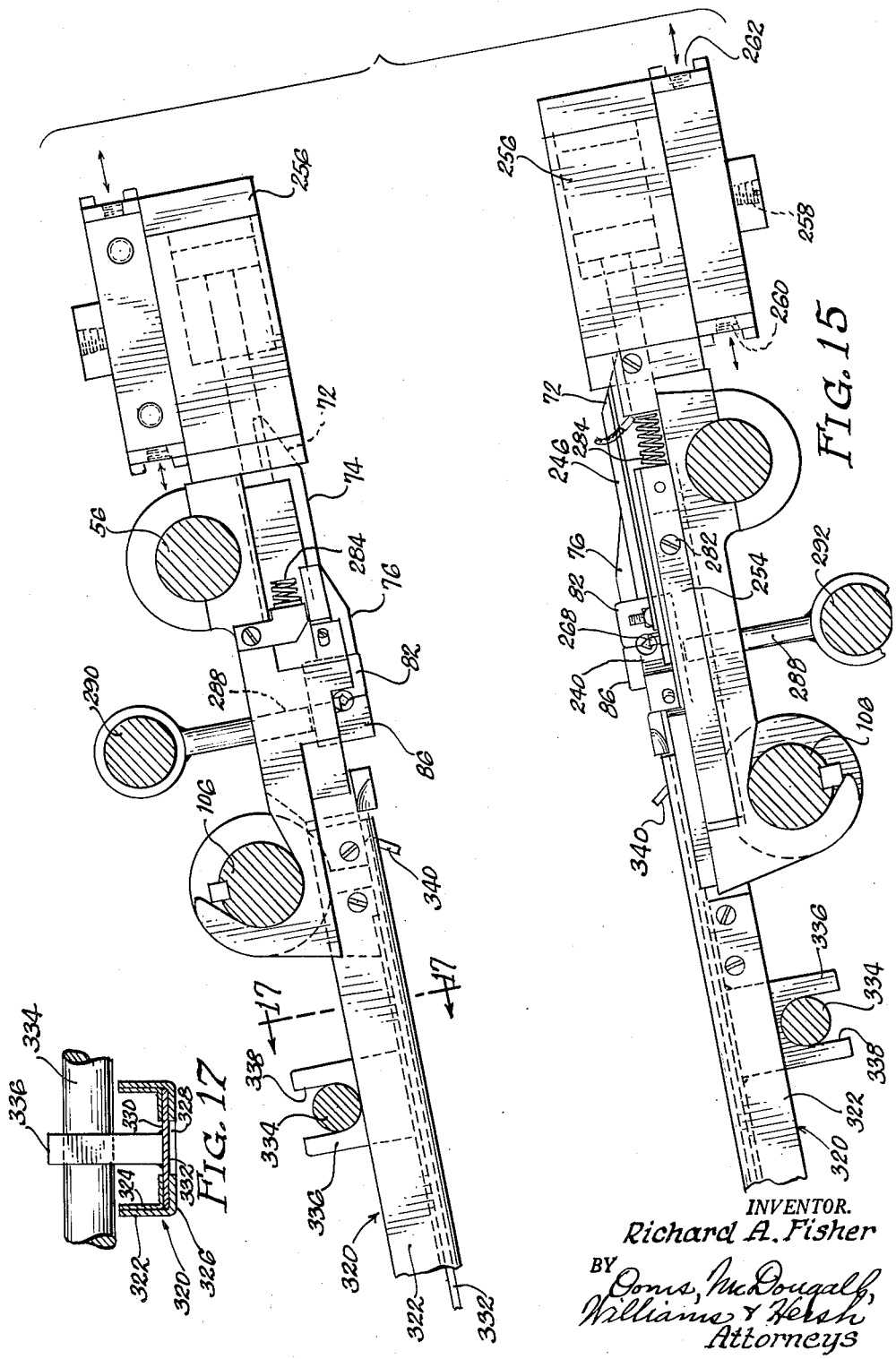
FIGURE 15 is a sectional view through the head of the machine adjacent the end jaw embodying the cutoff and clinch mechanism.

As illustrated in FIGURE 14, the spinners 172, 174 and 176 are each formed with longitudinally spaced-apart, peripheral grooves 204, 206 and 208, with the grooves in one spinner being spaced axially from the grooves of another, whereby the helix of the helical tie wire is received within the respective grooves to screw the helical tie wire forwardly in feeding relation endwise into the machine in response to rotational movement of the spinner. Simultaneously with the described feeding relationship, the helical tie wire is also caused to turn about its axis as the spinners are rotated together in one direction.

Rotational movement is imparted to the spinners by means of an endless belt 210 threaded over pulleys 212 fixed to the spinner shafts 214. Linear movement is imparted to the belt by a pulley 216 mounted on a shaft 218 common with a larger pulley 220 connected by another endless V-belt 222 to a pulley 224 on the end of the drive shaft 226 of an electric motor 228.

The endless belt 210 can be threaded over the pulleys of the two sets of spinners, or separate belts may be provided for each set. The endless belt is adapted to be adjusted for tension by an idler roller 230 over which the belt travels between the sets of spinners. For purposes of effecting a more positive transfer of force, the belts may be formed with cogs 232 or teeth spaced for operative engagement with a gear-type pulley on the spinner shafts.

Thus, as the drive motor 228 is operated, the spinners 172, 174 and 176 are rotated at high speed. When the drive spinner 176 is displaced to operative position, the helical tie wire is resiliently engaged between the set of three spinners, whereby it is driven endwise through the aligned tubular guide opening while turning about its axis to interlace the overlapped edge portions of the terminal coils of the adjacent rows of coil springs.

The cross plates or ribs 95 and 95$^a$ in each clamping member are spaced crosswise to correspond with the pitch of the helical tie wires with the cross plates 95 on one side sloped in one direction and the cross plates 95$^a$ on the other side sloped in the opposite direction to correspond with the slope of the wire sections advanced therebetween. Each cross plate is provided with a notched central portion 236 to locate the coil with respect to the diameter of the helical as it is forced into the jaws. The described notched cross plates also provide for proper pitch alignment of the helical as it is threaded through the jaws for interlacing the coil springs.

When the leading ends of the upper and lower helicals traverse the aligned group of jaw members, the end portions trip a switch which operates to disengage the feed spinner 176 and to initiate the cutoff and clinch mechanism. Cutoff and clinch is effected at the opposite ends of each of the interlaced helical tie wires to sever the helicals adjacent the outermost coil spring in each of the rows and to form a loop 34 on the ends of the helicals which prevents unthreading of the helicals. Since only minor variations exist in the four sets of cutoff and clinch devices, depending somewhat upon their location in the machine, and in order to expedite the description of the invention, only one cutoff and clinch device will hereinafter be described as representative of the others.

Referring to FIGURES 15, 16, 21 and 22, a knife 240 is removably secured within a holder 242 extending upwardly through an elongate slot 244 extending angularly in a cover plate 246 secured to the bed of the machine immediately beyond the outermost jaw member of each group. The holder 242 extends upwardly from a flat base plate 248 confined between the cover plate 246 and the bed of the machine for sliding movement between actuated and retracted positions of adjustment. The base plate 248 is provided at one end with a roller 250 adapted operatively to engage the cam surface 252 of a camming member on the rearward end of an actuating arm 254 adapted for lengthwise movement between a normal position, shown in solid lines in FIGURE 16, and an operated position forwardly thereof. The actuating arm 254 is adapted to be operated by an air cylinder 256 provided with an air port 258 for the introduction of air under pressure and outlet air ports 260 and 262 on each side whereby movement of the piston within the cylinder is effected in one direction or the other in response to normal valve control. The piston rod 264 is connected to the actuating arm 254 of the cutoff and clinch mechanism for transmitting movement of the piston to like movement of the cam member 252 rigidly secured thereto.

As the piston is caused to shift forwardly in the cylinder, the cam member is correspondingly displaced to actuated position. This will cause the roller 250 to ride upwardly on the cam surface 252 and effect displacement of the base plate 248 and the knife and holder in a direction to the right in FIGURE 16 or in a direction to the left in FIGURE 14. Such displacement is transmitted by the fact that the holder is slidably received in the angular slot 244 into angular movement in alignment with the slot thereby positively to displace the cutting edge 266 of the knife in the direction toward a vertically disposed stationary knife member 268 and between which a portion of the helical tie wire extends, as illustrated by the broken lines in FIGURE 21.

The stationary knife 268 which extends upright in the path of the movable knife blade 240 comprises a section of a rod-like member having its radii meeting to form a relatively sharp edge 270 adapted to cooperate with the cutting edge 266 of the movable knife 240 to sever the portion of the helical tie wire therebetween as the movable knife clears the edge of the stationary knife. A portion 272 of the movable knife immediately below the cutting edge is carved out to accommodate the helix of the tie wire so that forces conflicting with a close tolerance between the cutting edges will not develop.

In an endwise alignment with the movable knife and crosswise of the stationary knife 268 is a back-up pin 274 which is fixed to the stationary jaw 80 and extends into the curvilinear recessed portion 89 defining the tubular guide opening through which the helical tie wire is advanced to interlace the terminal coils of the coil springs. The back-up pin 274 is positioned to engage the helix of the tie wire immediately adjacent the end previously cut by the knife blade.

Thus, as the cutting knife 240 continues in its lateral movement towards actual position, the edge 276 of the cut helix is engaged by the leading edge of the knife blade to effect crosswise displacement thereof. Such displacement is resisted by the back-up pin 274 so that the end helix of the cut helical tie wire is clinched between the elements and deformed into a loop 34. The portion of the blade immediately below the cutting edge is preferably formed blunt with an angular recess to receive and hold the terminal coil of the coil spring out of position while the clinching operation is carried out.

The angular stroke of the knife is calculated to reach into the tubular guide opening in a manner to avoid the overlapped terminal coils of the coil springs so that the cutting and clinching operations can be acrried out without interferences one with the other.

The knife and holder are automatically returned to retracted position in response to reversal of the outlet ports in the air cylinder thereby to displace the cam plate 252 towards its normal position. For this purpose, a resilient means is provided constantly to urge the base plate 248 and the knife to retracted position. In the modification illustrated, such means takes the form of a stud 278 fixed to the edge of the base plate 240 to extend laterally into a guide slot in the rearward portion of the jaw member. A coil spring 280 is positioned about the stud with one end bearing against the base plate while the other end is received within the guide slot constantly to urge the base plate towards retracted position.

Figure 16:
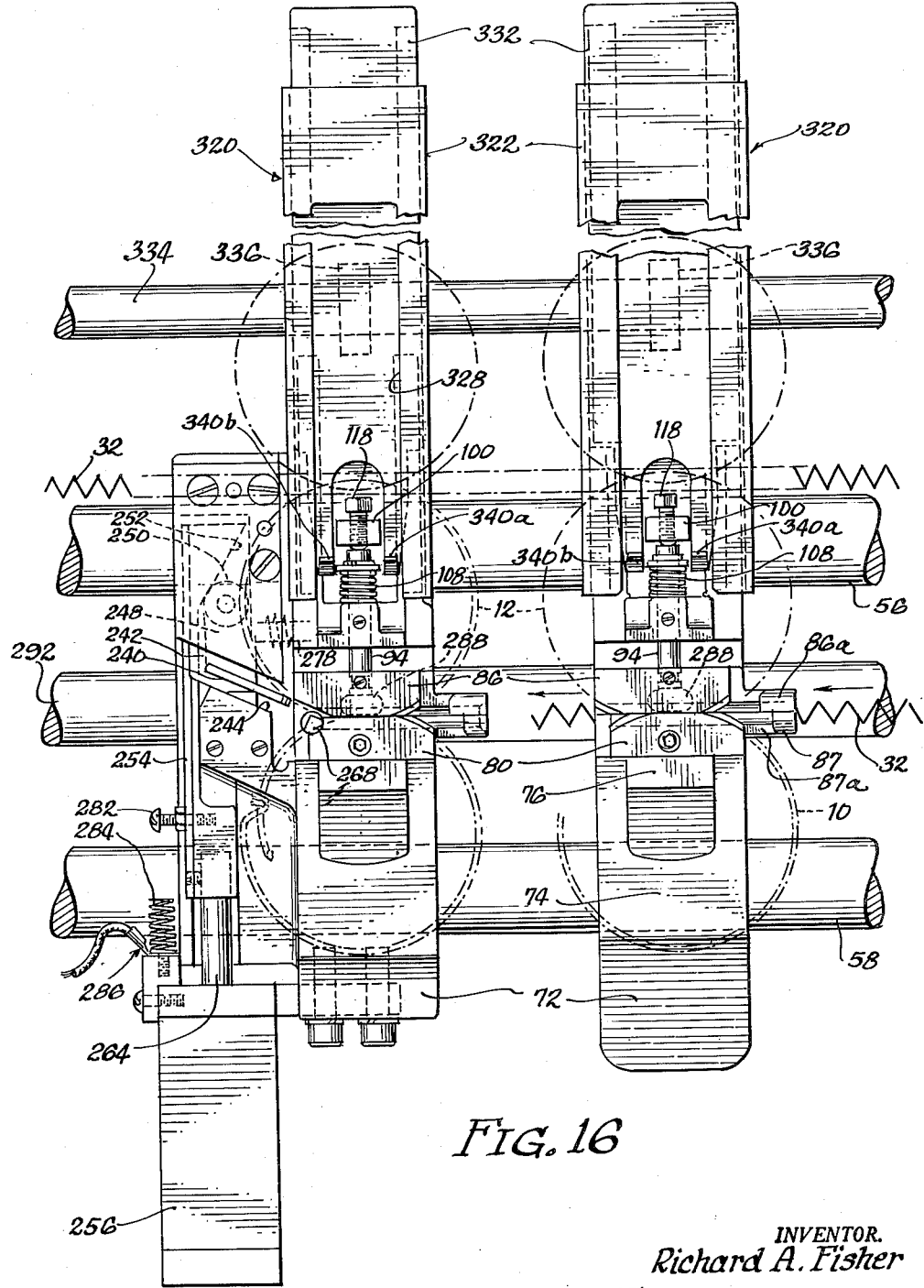
FIGURE 16 is a top plan view of the lower jaw shown in FIGURE 15.

As illustrated in FIGURE 16, the actuating arm is provided with an abutment 282 in position to engage a coil spring 284 in the path thereof when the arm 254 is displaced to operative position. Engagement of the spring operates to make a switch 286 which communicates the other of the air ports 260 and 262 to reverse the movement of the piston in the air cylinder 256 to return the arm 254 to normal position, whereby the cutoff and clinch are also returned.

Before displacement of the assembled springs to position the newly attached row into the position formerly occupied by the previously attached row and to release the jaws for the insertion of a new row of untied coil springs, it is desirable to displace the tied terminal coils from between the clamping members. This is effected after the ends of the helical tie wires have been cut and clinched and the shafts 106 rocked in the reverse direction to enable the coil springs 108 to become effective for displacement of the movable clamping members 86 to open position.

Removal of the tied terminal coils from between the clamping members is effected by a knockout pin 288, one for each jaw, with the upper pins all extending downwardly from a cross rod 290 and the lower pins extending upwardly from a similar bar 292 in endwise alignment with the rear face of the fixed clamping member. The knockout pins are dimensioned to have a thickness less than that of the movement of the movable clamping member between open and closed positions so that the knockout pins can be displaced into the area between the clamping members when the movable clamping member is displaced to open position (see FIGURE 11). The knockout pins 288 are aligned with the area between the rods 92 to avoid interferences therewith.

Referring now to FIGURE 6, displacement of the bars 290 and 292 between retracted and knockout position is effected by an air cylinder 294 pivoted at its base upon a bracket 296 rigid with the frame. The end of the piston rod 298 is pivoted onto the end of a lever 300. The other end of the lever is rigid with a shaft 302 rotatably mounted within a bearing 304 fixed to the frame. Also rigid with the shaft for rocking movement therewith is an angled lever arm 306 having its free end 308 in position to engage a slide block 310 mounted for endwise sliding movement in a guide and in which the bar 290 or 292 is journalled. The slide block is urged towards retracted position by a spring 312 having one end bearing against the jaw frame 314 while the other end is threaded over a stud 316 rigid with an ear 318 extending laterally from the block 310. Thus, responsive to movement of the piston towards the base of the cylinder 294, the lever 300 is rocked with the shaft 302 in a direction to bring the end 308 of the angled arm 306 into engagement with the slide block 310 to effect displacement thereof toward knockout position. The block carries the shaft and all of the knockout pins to knockout position to effect displacement of the terminal coils from between the open position, as illustrated in FIGURE 11. Return of the piston towards the head of the cylinder 294 reverses the positions of the levers to free the slide block 310 for return to retracted position in response to the resilient force of the spring 312.

Having released the coil springs from between the clamping members, the next operation is to advance the assembled springs one position to index the last row of the tied springs with the trailing edges of the terminal coils in a position to be engaged by the movable clamp 86 upon movement to closed position to lock the trailing edges in overlapping relation with the leading edge of the newly inserted untied row of coil springs.

For this purpose, each jaw is provided with an elongate guide 320 extending rearwardly thereof. The guide comprises a channel-shaped section formed of inner and outer channel plates 322 and 324 joined at the side walls into an integral unit but spaced by the horizontal walls to provide a horizontally disposed guide slot 326 therebetween. The horizontal walls are each formed with a central slot 328 and 330 respectively extending from the rearward end of the channel guide almost to the forward end thereof.

Received within the slotted section 326 of the horizontally disposed wall is a flat slide plate 332 dimensioned to be received in fitting relationship therein for sliding movement between forward and rearward positions. Actuation of the slide plate within the guide slot is effected by a shaft 334 extending crosswise of the entire row of guide members and adjacent the back sides thereof. A plate 336 fixed to extend substantially perpendicularly from the back side of each of the slide plates, in an intermediate portion thereof, extends through the slotted wall 330 of the guide unit into position to be engaged by the shaft 334. For operative engagement, the plate 336 is formed with a recess 338 in the end thereof for receiving the shaft 334 in operative engagement to effect displacement of the plate responsive to similar displacement of the shaft.

The forward end portions of the slide plates are formed to provide hook members 340 extending outwardly through the front side of the slot 328 in the channel guide and into position to engage the adjacent terminal coils of the assembled coil springs. In order to avoid the actuating mechanism for the movable clamping members, the forward end portion of each of the slide plates is cut out to form laterally spaced-apart hook fingers 340a and 340b extending outwardly into the area between the jaws for spring engagement. Thus, as the shaft 334 is displaced rearwardly, similar movement is imparted to the slide plate 332 and the hook ends 340a and 340b whereby the hooks, preferably turned backwardly at an acute angle with the plate, operate to engage the adjacent terminal coil of the assembled coil springs to effect rearward displacement thereof between the jaws. The hook ends, being inwardly inclined, are capable of return to forward position without corresponding engagement and displacement of the springs since the terminal coils are cammed inwardly to clear the hook ends upon engagement.

Displacement of the shaft 334 between forward and rearward positions is effected by means of an air cylinder 342. As illustrated in FIGURES 5 and 6, the air cylinder is pivoted at its base upon a bracket 344 fixed to the frame. The free end of the piston rod 346 is pivoted onto the end of a bell crank lever 348 which is pivoted at its elbow 350 on a stud 352 fixed to the frame. The end of the other arm 354 of the bell crank lever is pivoted onto the end of a link 356 which extends substantially perpendicularly therefrom into pivotal engagement with the shaft 334. Thus retraction of the piston into the cylinder causes the bell crank lever to rock about its pivot in a direction to effect rearward displacement of the shaft 334. Opposite movement of the piston causes return of the shaft to forward or normal position.

Movement of the shaft to rearward position is calculated to effect rearward displacement of the spring assembly by an amount corresponding to the diameter of one coil spring to replace the one row of coil springs by the next so that the terminal coil springs of the last row of tied coil springs will be properly indexed to bring the trailing end portion into the area of the clamping members, when in open position. Proper indexing is achieved by controlling the stroke of the shaft 334 and corresponding displacement of the slide 332 to rearward position.

Means are provided for adjustment of the stroke. As illustrated in FIGURE 6, the shaft 334 also mounts a block 358 which is rigid with a rod 360 extending horizontally in substantially parallel relation with the slide plate 332. The rod is provided on its outer end with another block 362 fixed thereto in position to engage the ends of bolt members 364 and 366 adjustable endwise within a stationary housing 368 fixed to the frame. The amount which the bolts extend from the housing into the path of the block 362 can be adjusted by turning the bolts in one direction or the other. Thus the ends of the bolts function as adjustable stops in position to be engaged by the block 362 during rearward displacement with the arm to stop the shaft 334 in an adjusted rearward position.

When the last of the rows of the coil springs have been tied into the assembly to complete the spring assembly, it is desirable to increase the spaced relationship between the jaws to free the springs therebetween for removal of the assembled spring unit. Such bodily displacement of one set of the jaws in the direction away from the other to release the compression normally imposed upon the coil springs positioned therebetween is effected through an air cylinder 370, illustrated in FIGURE 5. The air cylinder is pivoted on a bracket 372 fixed to the frame. The end of the piston rod 374 is pivoted onto one end of a lever 376 pivoted intermediate its ends on a stud 378 fixed to the frame. The free end 380 of the lever pivotally supports a link 382 which extends upwardly to a yoke 384 (see FIGURE 4). The yoke supports a horizontally disposed rod 386 onto which a pair of rigid shafts 388 are supported. The upper ends of the shafts are received within suitable recesses 390 provided in the frame section supporting the upper set of jaws. Thus, if the piston in the air cylinder 370 is displaced towards the head, the lever arm 76 is rocked in a direction to raise the link 382 and correspondingly raise the shafts 388 in a direction to displace the upper head in the direction away from the lower head correspondingly to displace the jaw members. The upper head is guided in vertical movement by a sleeve rigid with the head and which receives the shafts 380 in telescoping relation. The head is constantly urged towards its lowered position of adjustment by gravitation. Reversal of the movement of the piston in the cylinder 370 will lower the shafts 382 to enable the head to return downwardly into normal position of rest thereby to reposition the jaws in a spaced relationship slightly less than the normal length of the coil springs to provide a slight compression to the coil springs as they are inserted therebetween. When the head has been lifted to its raised position, the spring assembly is free to be moved forwardly but preferably rearwardly for removal from the spring assembly machine described.

Figure 22:
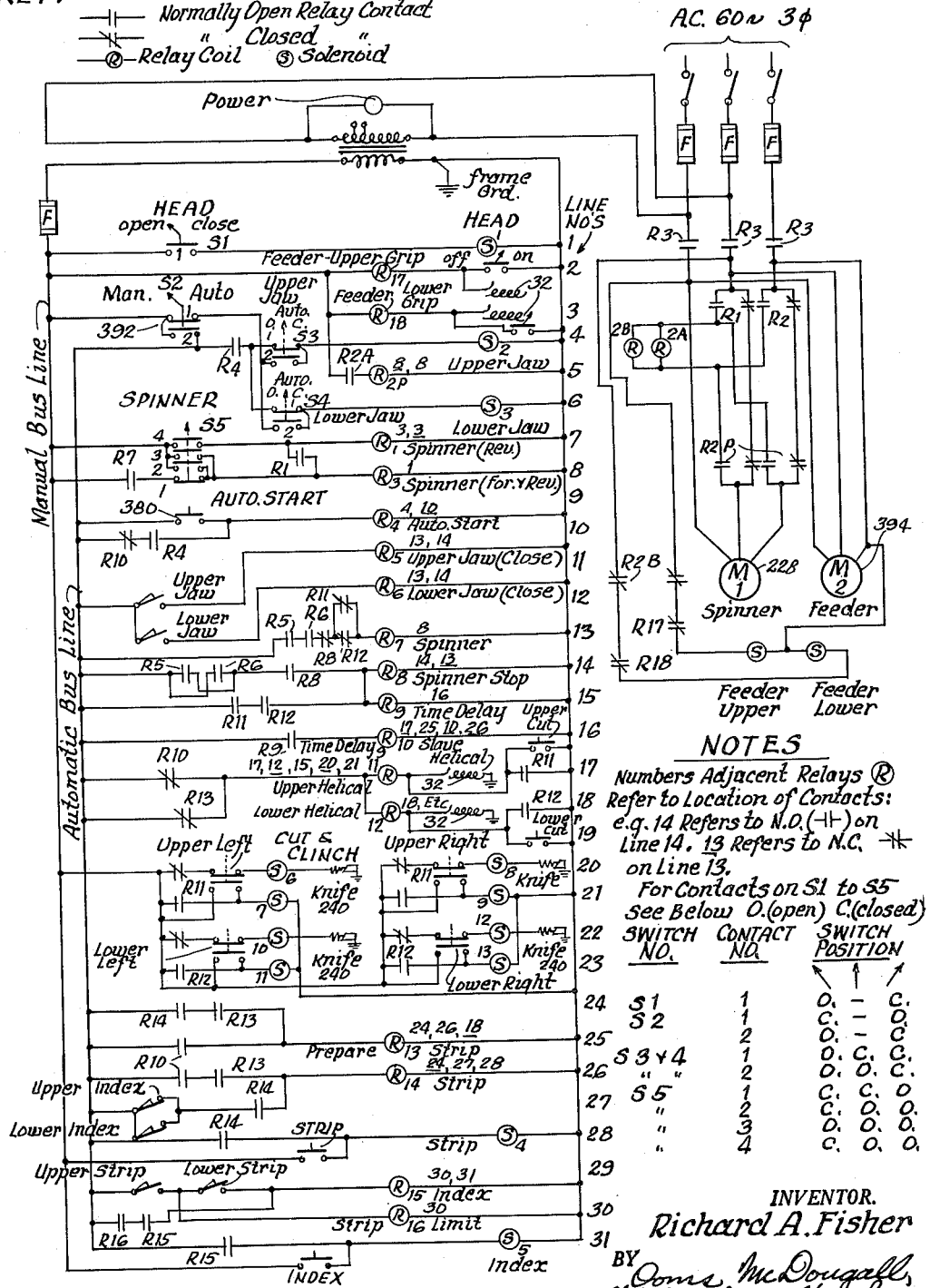
FIGURE 22 is an electric wiring diagram for the spring assembly machine.

In the following description of the sequence of operations of the machine, reference will be made, where necessary, to the complete electrical diagram for the machine, as set forth in FIGURE 22. Detailed description of the flow of electrical current through the various lines to the relays for automatic operation of the solenoids and switches is believed to be unnecessary for a full description of the invention, since the diagram is in itself believed to be sufficiently clear and complete. To assist in following the diagram, the various elements have been keyed one to the other in the drawing.

For purposes of description, it will be assumed that one or more rows 12 of coil springs have been tied one to the other and that the last of the rows has been properly indexed to place the trailing edges of the terminal coils of the coil springs in the path of the movable clamping member 86 with the space between the movable and stationary clamping members within the space between the stationary and movable clamping members, when in open position.

The lever 344, operated by the air cylinder 370, is in retracted position so that the upper head, supporting the upper jaws, will be in its lowered position with the spaced relationship between the jaws less than the normal dimension of the coil springs. A coil spring 10 is manually inserted between each of the pair of jaws crosswise in the row. Upon insertion, the coil springs will become slightly compressed. As the terminal coils of the coil springs ride upon the raised portions 76 on the faces of the jaw members, further compression will occur. As the leading edges of the terminal coils of the coil springs clear the front curvilinear face of the fixed clamping member 80, the tensioned relationship will operate to cause the free edge of the coils to snap into position in overlapping relation with the trailing edge of the previously tied row of coil springs within the open space between the clamping members. It is desirable to insert the coil springs with the knot extending laterally or outside the area between the clamping members.

When all of the coil springs have been inserted between the row of clamping members, a switch 392 is operated. This causes current to flow to the feeder motor 394 operatively connected to the shaft 164 whereby the drive rollers 155 and 156 are rotated and it causes current also to flow to the spinner motor 228 with corresponding rotation of the spinners 172, 174 and 176 of the machine. Responsive also to the actuation of the automatic switch, the air cylinders 120 and 130 are operated to rock the levers 128 and 136 in a direction to cause rotation of the shaft 106 to displace the abutment 100 forwardly into engagement with the rod 94. This causes the movable clamps 86 to be displaced from open to closed position to distort the overlapped portions of the terminal coils of the coil springs therebetween and to clamp said coils within the tubular guide opening that is formed.

Rocking movement of the levers 128 and 136 for displacement of the clamping members, from open to closed position, brings the adjustable nut members 396 on the ends of the levers into engagement to make switches 398. When the switches are made, the solenoids of the feeder arms 157 are made to rock the arms to raised position to bring the driving rollers 155 and 156 into operative engagement with the helical located between the rollers. Thus one of the helicals from each hopper will be advanced into feeding relationship toward the machine.

As the helical is advanced beyond the spinners 172, 174 and 176, the leading edge of the helical makes a switch having its arm located in the tubular guide adjacent the first jaw in the row. Responsive to making the switch, movable plate 180 is rocked to operative position to bring the spinners into engagement with the portion of the helical extending therebetween to advance the helical through the guide opening defined between the clamped jaws to interlace the terminal coils of the coil springs.

When the helical traverses the jaws, it engages a contact for operation of the cut and clinch mechanism. The switches for the top row of jaw members and the bottom row of jaw members are connected in series so that one is not effective until the other is made, indicating that both of the helicals have been inserted through the upper and lower terminal coils of the now tied coil springs. When both switches have been made, the cut and clinch devices at the opposite ends of the jaws in each of the upper and lower rows are operated by their respective air cylinders 256 to sever the ends of the helicals and to form a loop in the cut ends.

The spring contact 286 on the cut and clinch attachment operates as described to reverse the ports in communication with the air cylinder to return the cut and clinch actuating means to normal position. It also functions to shut off the motor drives 282 and 228 for the feed rollers and the spinners. The spring contact also operates a double acting solenoid which controls a time-delay relay which at first operates the air cylinders 120 and 130 to release the movable clamping members for resilient return by the coil springs 108 and it then operates the air cylinder 294 to cause the bell crank levers 306 to rock about its pivot and displace the knockout pins 288 to extended position between the open clamping members to displace the tied terminal coils from therebetween, as illustrated in FIGURE 11.

Responsive to movement of the knockout pins to knockout position, a microswitch is made to actuate the air cylinder 342 to rock the indexing arms 354 and 356 about their pivots for displacement of the indexing bar 334. Thus the tied coil springs are displaced one position between the jaws. The indexing arms engage a microswitch, when displaced to operative position, to operate air cylinders 294 and 234 to enable return of the indexing arms and knockout pins.

In the preferred modification, the top and bottom units are wired in series so that they operate together in the various steps of the cycle such that one step is not started until the previous steps in both the upper and lower sections have been successfully completed.

The air cylinder 370 for raising the upper head upon completion of the spring assembly for removal of the assembly and for lowering the upper head in starting a new assembly is controlled by a manually operated switch 288 on the machine.

It will be apparent from the foregoing that I have produced a spring assembly machine which is capable of automatic operation with a minimum amount of labor rapidly to produce a spring assembly wherein the coil springs are tied one to another in a uniform and tight relation to produce an improved assembly for use in bed springs, mattresses and in upholstered furniture. It will be apparent that the number of springs in a row can easily be varied by removal or by addition of the number of jaw members in each row thereby to provide great flexibility in the coil count of the springs embodied in the assembly. By the same token, it will be evident further that the spaced relationship occupied by each of the rows of coil springs may be varied by proper adjustment of the indexing means as controlled by the element 364 in position to be engaged by the block 362 of the indexing unit. Thus the coil count can also be varied and the amount of index varied in accordance with the diameter of the coil springs employed in the assembly.

By reason of the foregoing adjustments and others more specifically described in the specification, it will be apparent that the described spring assembly machine embodies greater flexibility in operation and adjustment whereby continuous operation can be achieved to produce spring assemblies in a most efficient and economical manner.

It will be understood that changes may be made with respect to the various types of drive mechanisms and their arrangement for operation of the various actuating means and that further changes may be made in the details of construction, arrangement and operation without departing from the spirit of the invention, especially as defined in the following claims.

I claim:

1. In a spring assembly machine, a plurality of spring supporting members arranged in facing pairs in vertically spaced apart relation in a crosswise row, each spring supporting member having a fixed clamping member and a movable clamping member arranged endwise of the fixed clamping member for movement in the direction toward and away from the fixed clamping member between open and closed positions respectively, crosswise extending grooves in the adjacent faces of said fixed and movable clamping members defining a crosswise extending channel guide therebetween in which the terminal coils of the coil springs of adjacent rows are clamped for being interlaced with helical tie wires, means for displacing the movable clamping members between open and closed position, a feed means at one end of the spring supporting members and in endwise alignment with the channel guides for advancing a helical tie wire linearly through the channel guides crosswise of the jaw members while concurrently turning the helical tie wires about the axis for interlacing the helical tie wires with the clamped edge portions of the terminal coils of the adjacent rows of coil springs, means responsive to the traverse of the channel guide by the helical tie wires to sever the free ends of the helical tie wires adjacent the outermost spring supporting members and to deform the ends to prevent unraveling, vertically reciprocating knock-out pins for displacing the tied terminal coils of the coil springs in adjacent rows from between the fixed and movable clamping members when the latter is displaced to open position, and means subsequent to displacement for advancing the tied rows of coil springs to bring the last row into the position formerly occupied by the row immediately in advance thereof.

2. In a spring assembly machine, a plurality of spring supporting members arranged in facing pairs in vertically spaced apart relation in a crosswise row, means mounting one of said rows of spring supporting members in each pair for movement in the direction toward and away from the other between a raised and lowered position with the spring supporting members in each pair being spaced by an amount greater than the normal length of the coil springs when in raised position and less than the normal length of said coil springs when in lowered position, means for actuating said mounting means between raised and lowered positions, each spring supporting member having a fixed clamping member and a movable clamping member arranged endwise of the fixed clamping member for movement in the direction toward and away from the fixed clamping member between open and closed positions respectively, crosswise extending grooves in the adjacent faces of said fixed and movable clamping members defining a crosswise extending channel guide therebetween in which the terminal coils of the coil springs of adjacent rows are clamped for being interlaced with helical tie wires, means for displacing the movable clamping members between open and closed position, a feed means at one end of the spring supporting members and in endwise alignment with the channel guides for advancing a helical tie wire linearly through the channel guides crosswise of the jaw members while concurrently turning the helical tie wires about the axis for interlacing the helical tie wires with the clamped edge portions of the terminal coils of the adjacent rows of coil springs, means responsive to the traverse of the channel guide by the helical tie wires to sever the free ends of the helical tie wires adjacent the outermost spring supporting members and to deform the ends to prevent unraveling, means for displacing the tied terminal coils of the coil springs in adjacent rows from between the fixed and movable clamping members when the latter is displaced to open position, and means subsequent to displacement for advancing the tied rows of coil springs to bring the last row into the position formerly occupied by the row immediately in advance thereof.

3. In a spring assembly machine, a plurality of spring supporting members arranged in facing pairs in vertically spaced apart relation in a crosswise row, each spring supporting member having a fixed clamping member and a movable clamping member arranged endwise of the fixed clamping member for movement in the direction toward and away from the fixed clamping member between open and closed positions respectively, crosswise extending grooves in the adjacent faces of said fixed and movable clamping members defining a crosswise extending channel guide therebetween in which the terminal coils of the coil springs of adjacent rows are clamped for being interlaced with helical tie wires, means for displacing the movable clamping members between open and closed position, a support for a plurality of helical tie wires in endwise alignment with the upper and lower rows of the spring supporting members, means for displacing one of said plurality of tie wires from said support to said rows of spring supporting members, a feed means at one end of the spring supporting members and in endwise alignment with the channel guides crosswise of the jaw members while concurrently turning the helical tie wires about the axis for interlacing the helical tie wires with the clamped edge portions of the terminal coils of the adjacent rows of coil springs, means responsive to the traverse of the channel guide by the helical tie wires to sever the free ends of the helical tie wires adjacent the outermost spring supporting members and to deform the ends to prevent unraveling, vertically reciprocating knock-out pins for displacing the tied terminal coils of the coil springs in adjacent rows from between the fixed and movable clamping members when the latter is displaced to open position, and means subsequent to displacement for advancing the tied rows of coil springs to bring the last row into the position formerly occupied by the row immediately in advance thereof.

4. In a spring assembly machine, a plurality of spring supporting members arranged in facing pairs in vertically spaced apart relation in a crosswise row, means mounting one of said rows of spring supporting members of each pair for movement in the direction toward and away from the other between raised and lowered positions with the spring supporting members in each pair being spaced by an amount greater than the normal length of the coil springs, when in raised position, and less than the normal length of said coil springs, when in lowered position, means for actuating said mounting means for movement of said spring supporting members between raised and lowered positions, each of said spring supporting members having a fixed clamping member and a movable clamping member arranged endwise of the fixed clamping member for movement in the direction toward and away from the fixed clamping member between open and closed positions respectively, crosswise extending grooves in the adjacent faces of said fixed and movable clamping members defining a crosswise extending channel guide therebetween in which the terminal coils of the coil springs of adjacent rows are clamped for being interlaced with helical tie wires, means for displacing the movable clamping members between open and closed position, a support for a plurality of helical tie wires in endwise alignment with the upper and lower rows of the spring supporting members, means for displacing one of said plurality of tie wires from said support to said rows of spring supporting members, a feed means at one end of the spring supporting members and in endwise alignment with the channel guides crosswise of the jaw members while concurrently turning the helical tie wires about the axis for interlacing the helical tie wires with the clamped edge portions of the terminal coils of the adjacent rows of coil springs, means responsive to the traverse of the channel guide by the helical tie wires to sever the free ends of the helical tie wires adjacent the outermost spring supporting members and to deform the ends to prevent unraveling, means for displacing the tied terminal coils of the coil springs in adjacent rows from between the fixed and movable clamping members when the latter is displaced to open position, and means subsequent to displacement for advancing the tied rows of coil springs to bring the last row into the position formerly occupied by the row immediately in advance thereof.

5. A spring assembly machine as claimed in claim 1 in which the spring supporting members comprise metal members having a horizontally disposed jaw portion, an inclined portion leading to the horizontally disposed portion for guiding the coil springs to between the spring supporting members, and a saddle portion of curvilinear contour in cross-section raised from the body portion to conform to the contour in the terminal end portion of the coil springs.

6. A spring assembly machine as claimed in claim 1 in which the spring supporting member comprises a rigid member having a recess extending crosswise thereof and a length greater than the combined lengths of the fixed clamping member and the movable clamping member, said fixed clamping member being attached in one end of the recess and the movable clamping member being maintained in the remainder of the recess for shifting movement between open and closed positions.

7. A spring assembly machine as claimed in claim 1 which includes lateral extensions integral with each of the fixed and movable clamping members and dimensioned to have a length corresponding to the spaced relation between the clamping members of the adjacent spring supporting members, and crosswise extending grooves in the abutting faces of the extensions in crosswise alignment with the grooves in the fixed and movable clamping members to define a substantially continuous guide channel therebetween extending crosswise of the rows of clamping members.

8. A spring assembly machine as claimed in claim 6 which includes means for guiding the movable clamping member in the direction toward and away from the fixed clamping member comprising more than one laterally spaced apart guide rod extending lengthwise from one adjacent end of one of the clamping members and corresponding openings in the adjacent end of the other clamping member for receiving the guide rods in sliding relationship therein.

9. A spring assembly machine as claimed in claim 1 which includes ribs fixed in the grooves of the clamping members and spaced one from the other laterally by an amount corresponding to the pitch of the helical tie wire for guiding the helical tie wire through the machine with the ribs in one clamping member inclined in one direction and the ribs in the other clamping member inclined in the other direction corresponding with the angular relation of the adjacent portions of the helical tie wire when extending therebetween.

10. A spring assembly machine as claimed in claim 9 in which each of the ribs is formed with a notch in the outer edge and in the central portion thereof through which the helical tie wires extend when the clamping members are in closed position.

11. A spring assembly machine as claimed in claim 1 in which the means for displacing the movable clamping member between open and closed position comprises an abutment positioned rearwardly of each movable clamping member, means mounting said abutment in each row for simultaneous movements in a direction toward and away from the movable clamping member, a rod rigid with each of the movable clamping members and extending rearwardly thereof into the path of the abutment for positive displacement of the rod and clamping member to closed position responsive to movement of the abutment in one direction and for release of the rod and clamping member for return to open position in response to movement of the abutment in the opposite direction, and resilient means constantly urging said rod and clamping member toward open position.

12. A spring assembly machine as claimed in claim 11 which includes means for adjusting the position of the abutment in the direction toward and away from the rod to vary the position of the rod and clamping member in open and closed position.

13. A spring assembly machine as claimed in claim 3 in which the support for the helical tie wires comprises an elongate tray having a trough portion in the base thereof dimensioned in cross-section to correspond with the cylindrical section defined by the helical tie wire.

14. In a spring assembly machine, a plurality of spring supporting members arranged in facing pairs in vertically spaced apart relation in a crosswise row, each spring supporting member having a fixed clamping member and a movable clamping member arranged endwise of the fixed clamping member for movement in the direction toward and away from the fixed clamping member between open and closed positions respectively, crosswise extending grooves in the adjacent faces of said fixed and movable clamping members defining a crosswise extending channel guide therebetween in which the terminal coils of the coil springs of adjacent rows are clamped for being interlaced with helical tire wires, means for displacing the movable clamping members between open and closed position, a support for a plurality of helical tie wires in endwise alignment with the upper and lower rows of the spring supporting members, means for displacing one of said plurality of tie wires from said support to said rows of spring supporting members comprising a combination of rollers including a bottom roller and side rollers spaced for rotational movement about centers whereby the peripheries of the rollers define an area therebetween corresponding to the cylindrical section of a cylindrical helical tire wire for engagement of a helical tie wire therebetween to impart rotational movement thereto relative to the remainder of helical tie wires to unthreaded the engaged helical tie wire from the remainder in nested relationship therewith, and means for moving at least one of said rollers in a direction toward and away from the direction of the helical tie wire between operative and inoperative positions respectively, a feed means at one end of the spring supporting members and in endwise alignment with the channel guides for advancing a helical tie wire linearly through the channel guides crosswise of the jaw members while concurrently turning the helical tie wires about the axis for interlacing the helical tie wires with the clamped edge portions of the terminal coils of the adjacent rows of coil springs, means responsive to the transverse of the channel guide by the helical tie wires to sever the free ends of the helical tie wires adjacent the outermost spring supporting members and to deform the ends to prevent unraveling, means for displacing the tied terminal coils of the coil springs in adjacent rows from between the fixed and movable clamping member when the latter is displaced to open position, and means subsequent to displacement for advancing the tied rows of coil springs to bring the last row into the position formely occupied by the row immediately in advance thereof.

15. A spring assembly machine as claimed in claim 1 in which the feed means at one end of the spring assembly machine comprises a group of cylinders mounted for rotational movement about parallel axes and spaced one from another to correspond to the cylindrical section defined by a helical tie wire for transmission of rotational movement to the helical tie wire, and axially spaced annular grooves in the peripheral walls of the cylinders with the grooves in one cylinder offset axially from the grooves in the other cylinders by an amount corresponding to the pitch of the helical tie wire therebetween to cause lengthwise displacement of the helical tie wire concurrently with its rotational movement about its own axis.

16. A spring assembly machine as claimed in claim 15 in which three cylinders are arranged about the helical tie wire and which includes means mounting at least one of said cylinders for movement in the direction toward and away from the helical tie wire between operative and inoperative positions respectively, and means for actuating said rollers between operative and inoperative positions.

17. A spring assembly machine as claimed in claim 1 in which the cut and clinch mechanism comprises an elongate arm having a cutting edge in one end thereof, a holder mounting the arm for reciprocal movement in the direction toward and away from the clamping members, an abutment fixed to the clamping member in endwise alignment with the elongate arm and in position to back the helical tie wire, a stationary cutting member fixed in the path of the cutting edge of the arm to sever the helical tie wire therebetween when the cutting edge of the arm passes the stationary cutting member, and means on the leading edge of the arm for continuing to engage the cut edge of the helical tie wire to deform the edge portion as the arm continues towards the abutment to operative position, and means for actuating the holder and arm in the direction toward and away from the stationary cutting member and abutment between operative and inoperative positions respectively.

18. A spring assembly machine as claimed in claim 1 in which the displacement means comprises a pin mounted perpendicular to the base of a spring supporting member and in alignment with the space between the clamping members when the latter are in open position, and means operative when the clamping members are in open position to displace the pin into the area between the clamping members to operative position and to retract the pin from the area between the clamping members when in normal position.

19. A spring assembly machine as claimed in claim 1 in which the means for advancing the tied rows of coil springs comprises an elongate channel guide extending rearwardly from the spring supporting members and in substantial alignment therewith, a slide plate mounted for linear sliding movement in said channel guides between normal and operated positions, hook means on the forward end of said slide plates projecting outwardly into the path of said coil springs to engage the adjacent terminal coils of the aligned coil springs rearwardly thereof, means for effecting displacement of said slide plate between normal and operated positions to engage the terminal coils of the tied coil springs during displacement from normal to operated position to effect displacement of the coil spring assembly.

20. A spring assembly machine as claimed in claim 19 which includes means for adjustment of the stroke of the slide plate between normal and operated positions and in which the hooks are rearwardly inclined to enable the hooks to clear the coil springs upon return movement from operated to normal position but to engage the coils during movement from normal to operated position to effect displacement of the spring assembly.

References Cited in the file of this patent

UNITED STATES PATENTS

| | | |
|---|---|---|
| 1,930,715 | Heuer | Oct. 17, 1933 |
| 2,388,106 | Woller | Oct. 30, 1945 |
| 2,742,934 | Weston | Apr. 24, 1956 |